(12) United States Patent
Thompson et al.

(10) Patent No.: US 12,192,639 B2
(45) Date of Patent: Jan. 7, 2025

(54) THERMAL IMAGING SYSTEM HAVING VIEW-SHIFTING CAPABILITY

(71) Applicant: 3M INNOVATIVE PROPERTIES COMPANY, St. Paul, MN (US)

(72) Inventors: Darin K. Thompson, Huntersville, NC (US); Kimberly M. Henry, Monroe, NC (US); Longin J. Kloc, Charlotte, NC (US); David M. Barbarine, Waxhaw, NC (US)

(73) Assignee: 3M Innovative Properties Company, St. Paul, MN (US)

( * ) Notice: Subject to any disclaimer, the term of this patent is extended or adjusted under 35 U.S.C. 154(b) by 44 days.

(21) Appl. No.: 18/265,314

(22) PCT Filed: Nov. 22, 2021

(86) PCT No.: PCT/IB2021/060825
§ 371 (c)(1),
(2) Date: Jun. 5, 2023

(87) PCT Pub. No.: WO2022/123374
PCT Pub. Date: Jun. 16, 2022

(65) Prior Publication Data
US 2024/0056688 A1    Feb. 15, 2024

Related U.S. Application Data

(60) Provisional application No. 63/123,888, filed on Dec. 10, 2020.

(51) Int. Cl.
*A62B 18/08*    (2006.01)
*G06F 3/01*    (2006.01)
(Continued)

(52) U.S. Cl.
CPC ........... *H04N 23/698* (2023.01); *A62B 18/08* (2013.01); *G06F 3/012* (2013.01); *H04N 5/2628* (2013.01);
(Continued)

(58) Field of Classification Search
CPC .... H04N 23/698; H04N 5/2628; H04N 5/272; H04N 23/23; A62B 18/08; A62B 18/02;
(Continued)

(56) References Cited

U.S. PATENT DOCUMENTS 6,456,261 B1 * 9/2002 Zhang .................. G02B 27/017
345/9
6,476,391 B1 * 11/2002 Zhang ...................... G02B 9/10
359/356

(Continued)

FOREIGN PATENT DOCUMENTS

CA      2880874      7/2014
CN      108388012 A  8/2018
(Continued)

OTHER PUBLICATIONS

"Thermography Terms Explained: FOV, IFOV, IFOVmeasurement", [online], Mar. 10, 2010, (retrieved from the web on Nov. 10, 2020) URL <http://thermal-imaging-blog.com/index.php/2010/03/10/thermography-terms-explained-fov-ifov-ifovmeasurement-on-your-infrared-camera/#.X4SjZmhKhMM>, 6 pages.

(Continued)

*Primary Examiner* — Howard D Brown, Jr.
(74) *Attorney, Agent, or Firm* — Kenneth B. Wood

(57) ABSTRACT

A thermal imaging system for use with a respirator mask comprising an in-mask display unit, and methods of configuring and operating such a system. The system uses a thermal imaging camera to capture a thermal image. The system is configured with the capability to shift from a (Continued)

default view in which an in-mask micro-display of the in-mask display unit shows a primary subimage of the captured thermal image but does not show a secondary subimage of the captured thermal image, to an auxiliary view in which the secondary subimage is now shown in place of at least a portion of the primary subimage.

20 Claims, 11 Drawing Sheets

(51) Int. Cl.
H04N 5/262 (2006.01)
H04N 5/272 (2006.01)
H04N 23/23 (2023.01)
H04N 23/698 (2023.01)
G06F 3/16 (2006.01)

(52) U.S. Cl.
CPC ............ *H04N 5/272* (2013.01); *H04N 23/23* (2023.01); *G06F 3/167* (2013.01)

(58) Field of Classification Search
CPC ........ G06F 3/012; G06F 3/167; G06F 1/1694; G06F 3/011; G06F 1/163; G06F 3/017
See application file for complete search history.

(56) References Cited

U.S. PATENT DOCUMENTS

| | | | |
|---|---|---|---|
| 8,061,570 B1* | 11/2011 | Holmes | B63C 11/12 222/422 |
| 8,587,659 B1 | 11/2013 | Socolinsky et al. | |
| 10,452,152 B2* | 10/2019 | Joo | G02B 27/0172 |
| 11,677,834 B2* | 6/2023 | Bae | H04L 67/131 345/156 |
| 2012/0212499 A1* | 8/2012 | Haddick | G02B 27/0093 345/589 |
| 2015/0273248 A1* | 10/2015 | Kuutti | A62B 9/006 128/201.12 |
| 2016/0132189 A1 | 5/2016 | Choi et al. | |
| 2019/0033594 A1 | 1/2019 | Patil et al. | |
| 2019/0092613 A1 | 3/2019 | Baillargeon et al. | |
| 2019/0118008 A1 | 4/2019 | Thompson et al. | |
| 2020/0065559 A1* | 2/2020 | Vats | G06V 40/20 |
| 2020/0114178 A1* | 4/2020 | Waterford | A62B 23/025 |
| 2020/0393680 A1* | 12/2020 | H?gstedt | G01J 5/04 |
| 2021/0035428 A1 | 2/2021 | Baillargeon et al. | |
| 2021/0059344 A1* | 3/2021 | Ralston | G06F 3/013 |
| 2021/0087035 A1 | 3/2021 | Yip et al. | |
| 2021/0289851 A1* | 9/2021 | Hall | A62B 18/08 |
| 2021/0304509 A1* | 9/2021 | Berkebile | G06V 40/18 |
| 2022/0296939 A1* | 9/2022 | Hall | A41D 13/1161 |
| 2023/0325482 A1* | 10/2023 | Sabacinski | G01S 17/66 340/539.11 |

FOREIGN PATENT DOCUMENTS

| | | |
|---|---|---|
| CN | 111558181 | 8/2020 |
| EP | 3002249 | 4/2016 |
| EP | 3339240 | 6/2018 |
| WO | 2020075045 A1 | 4/2020 |

OTHER PUBLICATIONS

Installation and Operation Instructions: "Scott AV-3000 HT Full Facepiece", Product of Scott Safety Ltd, 2017, 34 pages.
International Search Report for PCT International Application No. PCT/IB2021/060825, mailed on Mar. 5, 2022, 3 pages.
Product Broacher: "3M™ Scott™ X380 and X380N Thermal Imager (Hand-held), 3M™ Scott™ V320 Thermal Imager (Hand-held), 3M™ Scott™ Sight In-Mask Thermal imager (Hands-free)", Products of 3M, 2020, 1 page.
Product Information: "3M™ Scott™ Sight In-Mask Thermal Imager With Pro Package", Product of 3M, 2019, 4 pages.
Product Information: "Scott Sight—Hands Free, Thermal In-Mask Imaging System", Product of Scott Technologies Inc., 2016, 9 pages.
Wilson, "Design of monocular head-mounted displays, with a case study on fire-fighting", Proceedings of the Institution of Mechanical Engineers Part C—Journal of Mechanical Engineering Science, Dec. 2007, vol. 221 (C12), pp. 1729-1743.
Anonymous: "Digital zoom—Wikipedia", Dec. 27, 2004 (Dec. 27, 2004), pp. 1-1, XP093206116, 1 Retrieved from the Internet: URL:https://en.wikipedia.org/w/index.php? title=Digital_zoom &oldid=8847711.

* cited by examiner

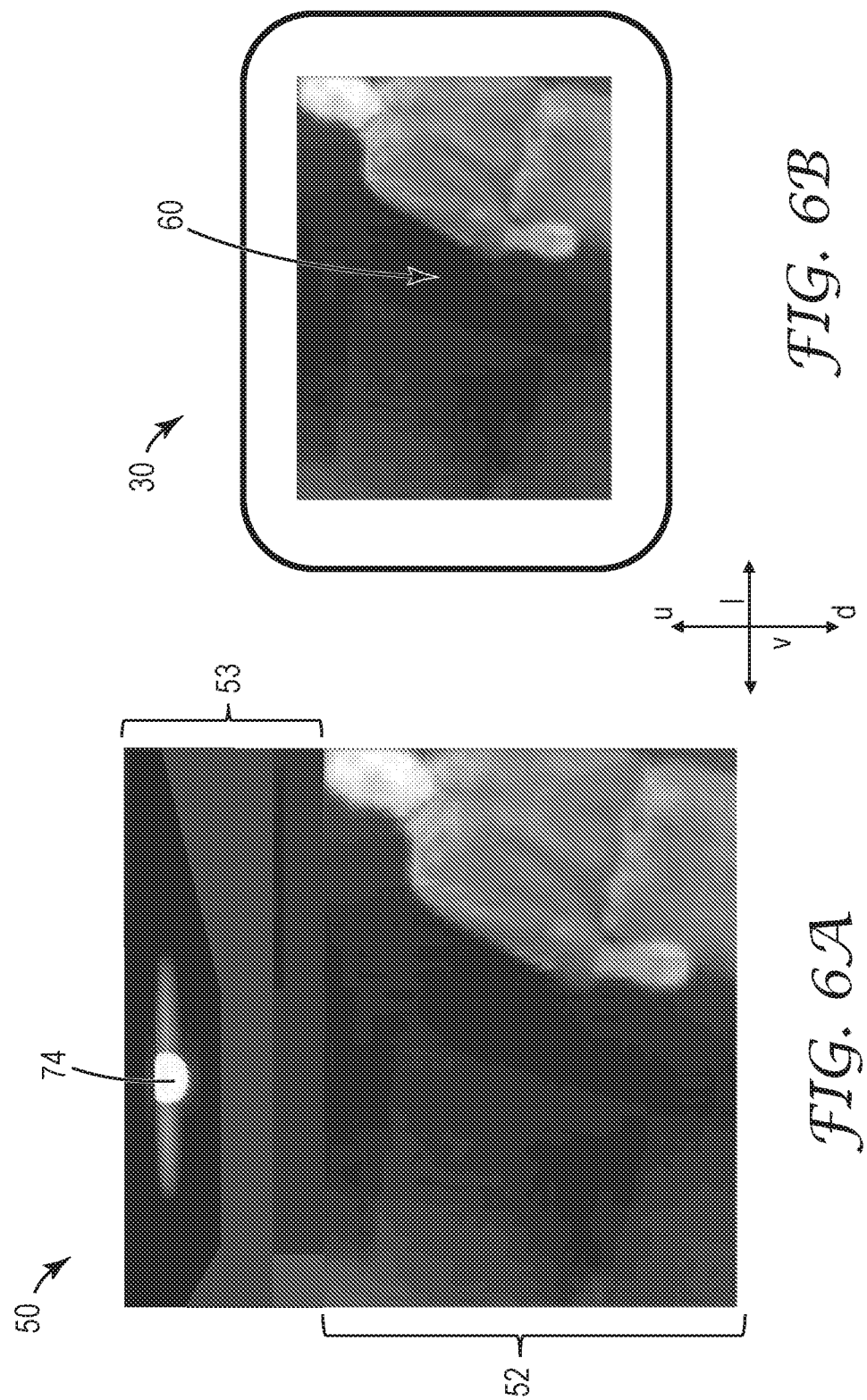

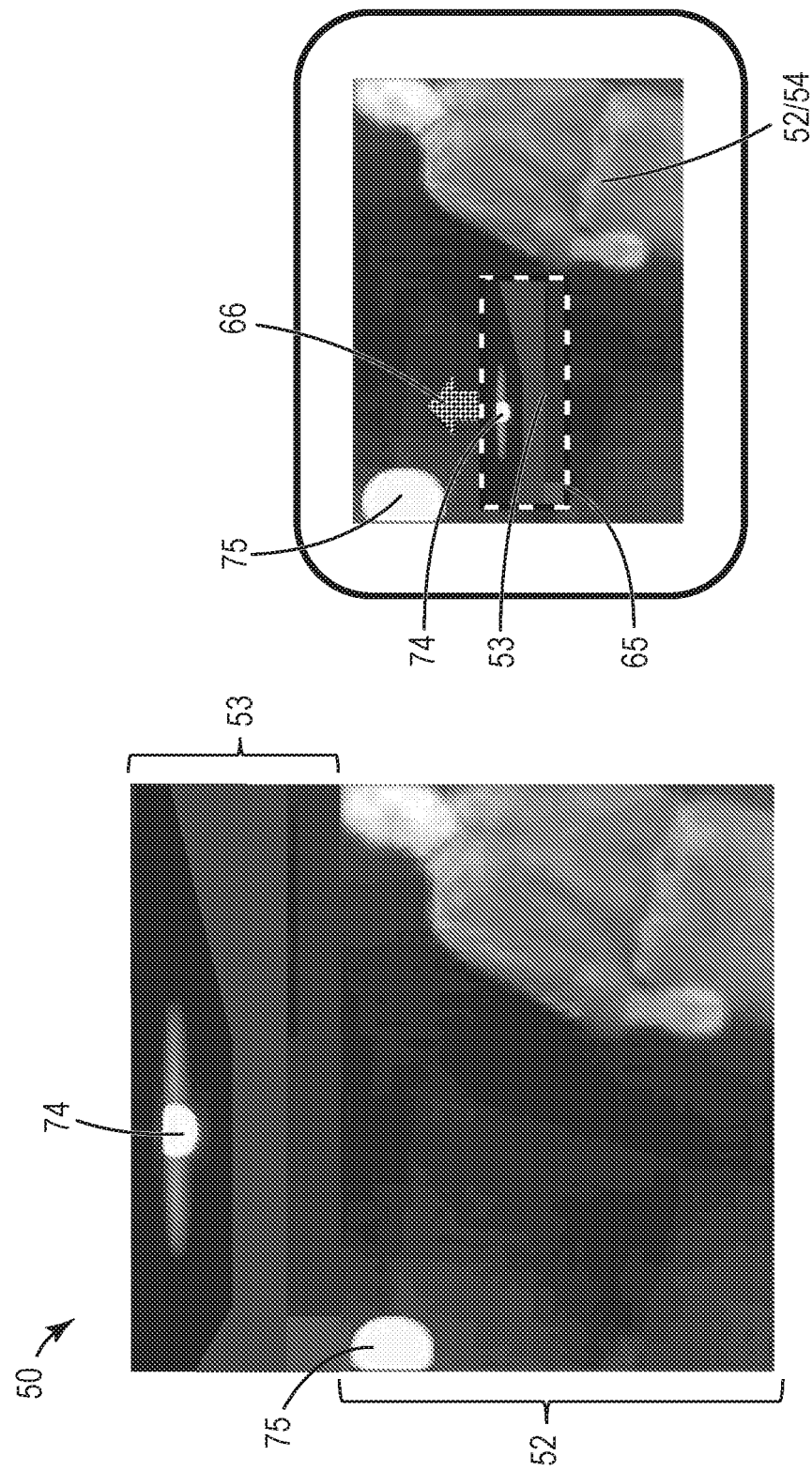

THERMAL IMAGING SYSTEM HAVING VIEW-SHIFTING CAPABILITY

CROSS REFERENCE TO RELATED APPLICATIONS

This application is a national stage filing under 35 U.S.C. 371 of PCT/IB2021/060825, filed 22 Nov. 2021, which claims the benefit of U.S. Provisional Patent Application No. 63/123,888, filed 10 Dec. 2020, the disclosure of which is incorporated by reference in its/their entirety herein.

BACKGROUND

Thermal imaging cameras have found increasing use in firefighting, search and rescue, and the like. Such cameras capture infrared light and transform it into a visible-light display, so that, for example, hot spots in a building may be detected.

SUMMARY

In broad summary, herein is disclosed a thermal imaging system for use with a respirator mask comprising an in-mask display unit, and methods of configuring and operating such a system. The system uses a thermal imaging camera to capture a thermal image. The system is configured with the capability to shift from a default view in which an in-mask micro-display of the in-mask display unit shows a primary subimage of the captured thermal image but does not show a secondary subimage of the captured thermal image, to an auxiliary view in which the secondary subimage is now shown in place of at least a portion of the primary subimage. These and other aspects will be apparent from the detailed description below. In no event, however, should this broad summary be construed to limit the claimable subject matter, whether such subject matter is presented in claims in the application as initially filed or in claims that are amended or otherwise presented in prosecution.

BRIEF DESCRIPTION OF THE DRAWINGS

FIGS. 6a and 6b respectively depict an image captured by a thermal imaging camera, and an exemplary display scenario of the resulting image as shown on an in-mask micro-display.

FIGS. 11a and 11b respectively depict an image captured by a thermal imaging camera, and still another exemplary display scenario of the resulting image as shown on an in-mask micro-display.

Like reference numbers in the various figures indicate like elements. Some elements may be present in identical or equivalent multiples; in such cases only one or more representative elements may be designated by a reference number but it will be understood that such reference numbers apply to all such identical elements. Unless otherwise indicated, all figures and drawings are not to scale and are chosen for the purpose of illustrating different embodiments of the invention. In particular the dimensions of the various components are depicted in illustrative terms only, and no relationship between the dimensions of the various components should be inferred from the drawings, unless so indicated. In the Figures, the "a" and "b" suffixes on FIGS. 6a/6b to 11a/11b are upper case ("A" and "B"); these correspond to the lower-case suffixes that appear in this written specification.

Although terms such as "first" and "second" may be used in this disclosure, it should be understood that those terms are used in their relative sense only unless otherwise noted. As used herein as a modifier to a property or attribute, the term "generally", unless otherwise specifically defined, means that the property or attribute would be readily recognizable by a person of ordinary skill but without requiring a high degree of approximation (e.g., within +/−20% for quantifiable properties). The term "substantially", unless otherwise specifically defined, means to a high degree of approximation (e.g., within +/−10% for quantifiable properties). The term "essentially" means to a very high degree of approximation (e.g., within plus or minus 2% for quantifiable properties); it will be understood that the phrase "at least essentially" subsumes the specific case of an "exact" match. However, even an "exact" match, or any other characterization using terms such as e.g. same, equal, identical, uniform, constant, and the like, will be understood to be within the usual tolerances or measuring error applicable to the particular circumstance rather than requiring absolute precision or a perfect match.

As used herein, the vertical axis and upward and downward directions along the vertical axis have their ordinary meaning with respect to a respirator mask (and associated equipment) worn by an upright human user. Similarly, the lateral axis and right and left directions along the lateral axis have their usual meanings with reference to a respirator mask worn by an upright human user. Terms such as forward and rearward as used with respect to a respirator mask and components thereof, respectively imply directions away from, and toward, the face of the user.

Figure 4:
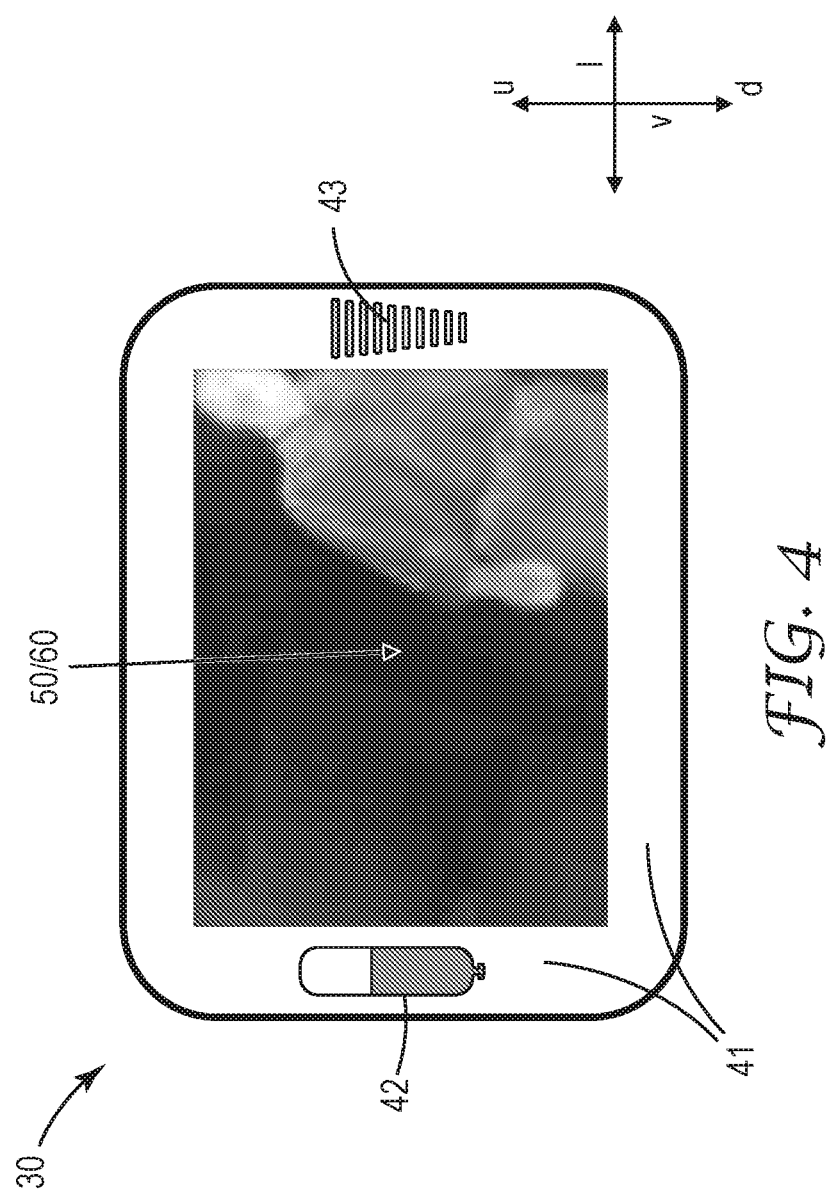
FIG. 4 is a rear view of an in-mask micro-display showing an exemplary display scenario.

The above terminology also applies to images shown on a display of a thermal imaging system, as discussed in detail herein. It will be understood that such terminology is used for convenience of description, noting that in actual practice, a person wearing a respirator mask and/or using a thermal imaging system associated with the respirator mask, may occasionally assume an orientation other than standing strictly upright. The vertical (v) and lateral (l) axes (and up and down directions (u) and (d) along the vertical axis) for an exemplary image as presented in an in-mask display are depicted in FIGS. 4 and 6a/6b. It will be understood that these apply in similar manner to other images as shown in other Figures herein.

The term field of view has its usual optical meaning as quantified in terms of a solid angle. By a thermal imaging camera with a wide-angle field of view is meant that the camera captures thermal images at a field of view of at least 65 degrees; by a wide-angle thermal image is meant such an image captured at a field of view of at least 65 degrees. The term micro-display denotes a display screen with an active display area that has a diagonal length of less than 2.0 inches. The term "configured to" and like terms is at least as restrictive as the term "adapted to", and requires actual design intention to perform the specified function rather than mere capability of performing such a function. All references herein to numerical values (e.g. dimensions, ratios, and so on), unless otherwise noted, are understood to be calculable as average values derived from an appropriate number of measurements.

DETAILED DESCRIPTION

Figure 1:
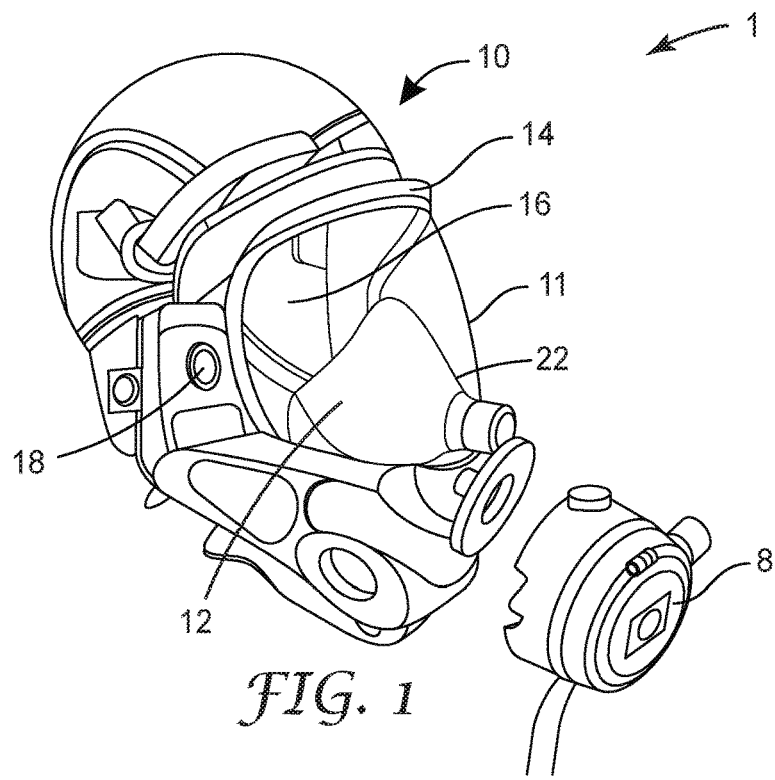
FIG. 1 is a side-front perspective view of an exemplary respirator mask assembly.

Disclosed herein is a thermal imaging system 1 that can be used in combination with a respirator mask. Shown in FIG. 1 is an exemplary respirator mask assembly 10, comprising a respirator mask 14 and various components thereof and equipment associated therewith, e.g. a head harness (unnumbered in FIG. 1) to hold the mask in place on the user's face, a generally forward-facing clear pane 11 through which the user can see, and so on. Such a respirator mask 14 will define an interior volume 16 when fitted to the face of a human user. A chief purpose of the respirator mask will be to deliver breathable air to the user. In aid of this, such a mask will often comprise a facepiece 12 (shown in generic representation in FIG. 1; visible in further detail in FIGS. 2 and 3) that resides within interior volume 16 and that fits snugly about the nose and mouth of the user to deliver breathable air thereto.

The respirator mask may comprise various connections, fittings and the like (unnumbered in FIG. 1) by which breathable air can be delivered to the user; typically these fittings are in communication with facepiece 12 so that air can be delivered to the user via the facepiece. In some embodiments the breathable air may be provided (via one or more regulators 8) from one or more pressurized air tanks 9 (visible in FIG. 5, which is discussed in detail later herein). In some embodiments the breathable air may be filtered air, having passed through, for example, one or more filter cartridges mounted onto fittings of the respirator mask.

As noted above, disclosed herein is a thermal imaging system 1 that is configured for use with a respirator mask 14. In many embodiments, the various components of the thermal imaging system may be installed (whether at the factory, or by the end user) within, and/or on the outside of, the respirator mask. (In some embodiments at least one component of the system may be configured to be mountable on some other entity, as discussed later herein).

Such a thermal imaging system 1 will rely on at least one thermal imaging camera 18. In the arrangement depicted in FIG. 1, the thermal imaging camera 18 is mounted on (i.e. attached to) the outside of the respirator mask; specifically, on the right lateral side (from the user's perspective) of the mask. However, in some arrangements, the thermal imaging camera can be mounted on some other item worn by the user of the respirator mask, for example a helmet or a garment (such as a belt, a protective article of clothing such as a coat, etc.). As disclosed herein, any such thermal imaging camera, whether mounted on the respirator mask or on a helmet or garment, will be termed a "wearable" camera, and allows hands-free use of the camera. A wearable camera will be distinguished from, e.g., a hand-held camera. Regardless of the exact item on which the wearable thermal imaging camera is mounted, the camera 18 will typically face generally forward, as in FIG. 1. In some embodiments, the position and/or orientation of the camera may be adjustable (e.g. to take into account the height of a user of the respirator mask). Such adjusting can be performed e.g. by loosening the attachment mechanism by which the camera is attached to e.g. the respirator mask, re-orienting the camera as desired, and then tightening the attachment mechanism. In most embodiments, any such adjustment will be performed in preparation of the thermal imaging system for use; typically, such cameras are not configured for on-the-fly adjustment of the position and/or orientation of the camera during actual use.

The thermal imaging system 1 will further rely on an in-mask display unit 20 (not visible in FIG. 1, but shown in FIGS. 2 and 2) that is positioned within the interior volume 16 of the respirator mask 14. In the exemplary arrangement depicted in FIGS. 2 and 3, the in-mask display unit comprises an in-mask micro-display 30 (discussed in detail later herein) that is mounted in a generally monocular eyepiece 17 (e.g. in the general form of a tapered tube). The in-mask display unit 20 may further comprise at least one lens (often referred to in the vernacular as an "optic") mounted somewhere in the eyepiece, rearward of the micro-display so as to be between the in-mask micro-display and the user's eye. In many embodiments the display unit may comprise (at least) two lenses, e.g. an ocular lens 31 that is positioned at the rearward end of the eyepiece 17, and an objective lens 32 positioned between the ocular lens and the micro-display.

Such lens(es) will serve to magnify the image shown on the micro-display and to place the image at an appropriate apparent distance from the user's eye. (Discussions herein will often refer to an image as being shown on micro-display 30; it will be understood that, in actual use, this refers to such an image as seen through the one or more lenses that are used in combination with micro-display 30.) Any suitable lens or lenses may be used, e.g., one or more simple lenses, aspheric lenses, Fresnel lenses, and so on.

Eyepiece 17 of in-mask display unit 20 can be attached to a support chassis 15, which in turn in turn can be attached to facepiece 12 and/or to any other component of respirator mask 14. In the depicted embodiment, chassis 15 is attached to an assembly (unnumbered) that is itself attached to facepiece 12 and/or to some other component of mask 14. In general, any suitable method or mechanism can be used to position the in-mask display unit 20, and the in-mask micro-display 30 thereof, within interior volume 16 of respirator mask 14. In some embodiments, the position and/or orientation of eyepiece 17 can be adjusted e.g. by way of various hinged connections (one such connection is visible (unnumbered) in FIG. 2, between chassis 15 and the component so which chassis 15 is attached. Similar to the camera 18, such adjustments are usually done in preparation of the thermal imaging system for use, with the in-mask display unit 20 typically not being configured for on-the-fly adjustment during actual use.

An in-mask display unit 20 must be positioned and sized so as to not unduly interfere with the user's ability to see out through the front pane 11 of the respirator mask 14. Specifically, the rearward end of eyepiece 17 and any ocular lens 31 positioned at this rearward end, will be the closest items to the user's eye and thus may have the largest impact on blocking the user's field of vision. So, the size of these items must be kept below a practical threshold. Because of these issues, an eyepiece of an in-mask display may often be set up (e.g., sized and positioned) so that the rearward end of eyepiece 17 (and, e.g. an ocular lens 31 positioned therein) will occupy a field of view that is less than 80 degrees, along the vertical direction. This field of view will be the solid angle encompassed by the upper and lower boundaries of the rearward end of the eyepiece, measured from a vertex at the user's pupil, when the respirator mask is fitted to the user's face for ordinary use. In various embodiments, this vertical field of view that is occupied by the rearward end of the eyepiece, may be less than 70, 65, 60, 55, 50, 45, 40, or 35 degrees. Similar ranges may apply for the horizontal field of view occupied by the rearward end of the eyepiece.

Such considerations also often preclude using an in-mask display unit that is large enough to be seen with both eyes. Thus, in many embodiments the in-mask display unit 20 comprises a monocular design in which a single eyepiece 17 is provided in which in-mask micro-display 30 is positioned so that it is only visible to a single eye. (In the depicted illustration of FIGS. 1-3, eyepiece 17 is positioned forward of the user's right eye; however, in some cases, e.g. for individuals who are left-eye dominant, the eyepiece and micro-display unit may be installed forward of the left eye.)

Furthermore, the size of the in-mask micro-display 30 itself will necessarily be limited, e.g. to a diagonal length of less than 2.0 inch, in comparison to displays of 3.5 inch diagonal length as are commonplace on many hand-held thermal imaging devices. A display that is 2.0 inch or less in diagonal length will be termed a micro-display as used herein. In some embodiments, such a micro-display may be even smaller, e.g. with a diagonal length of less than or equal to 1.5, 1.0, 0.80, 0.70, 0.60, 0.50, or 0.40 inches. (These dimensions refer to the active display area that presents an image; the active display area of a micro-display is often surrounded by a picture-frame border that contains various electronic equipment used to drive the display and to address the pixels of the display.) Such a micro-display may rely on any appropriate technology and operating mechanism, e.g. LCD, AMLCD, OLED, AMOLED, FLCOS, and so on.

The wearable thermal imaging camera 18 is configured to capture a thermal image, at least a portion of which is communicated to the in-mask micro-display 30. By this is meant that the captured image 50 will be transformed into data by a control system 19 with the data being sent to micro-display 30 and reconstituted as a displayed image 60. It is noted in passing that discussions herein are phrased primarily in terms of capturing an image, communicating an image to the in-mask micro-display 30 of the in-mask display unit 20, and so on. This terminology is used for convenience of description; in actuality, the thermal imaging system will capture, process, communicate, and display a continuing stream of images e.g. at a suitable frame rate. In some embodiments, such communication can occur through a "wired" (physical) connection, e.g. a wire or optical fiber. However, in some embodiments, the communication can be wireless, e.g. by way of Bluetooth or any other suitable radiofrequency communication protocol.

Figure 2:
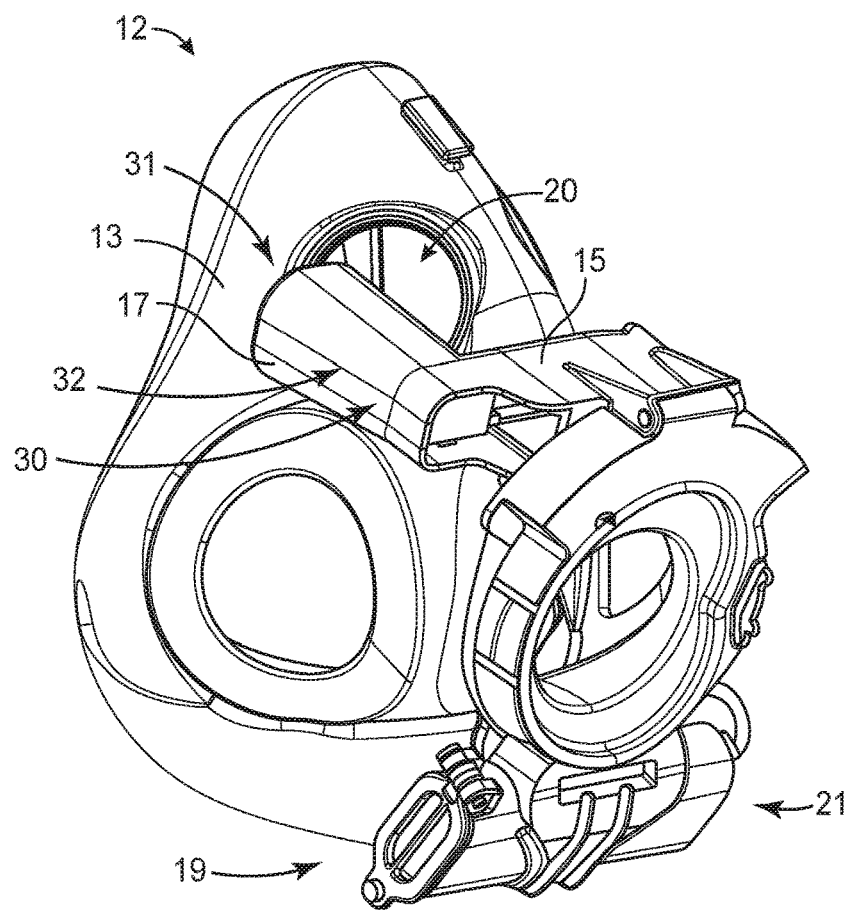
FIG. 2 is a side-front perspective view of an exemplary facepiece of a respirator mask, and an in-mask display unit of the respirator mask.

The communication of images from camera 18 to micro-display 30, as well as other aspects of the operation of the thermal imaging system, will be governed by a control system 19 (indicated in generic representation in FIG. 2). Such a control system can comprise any suitable hardware, e.g. one or more computing devices along with whatever ancillary items and components are needed to operate the computing device(s). Such a computing device will typically comprise one or more processors as present e.g. in an integrated circuit supported on a printed circuit board or flex circuit. In various embodiments, some or all of the components of control system 19 can be located, and operation of these components can occur, in any suitable location, e.g. in the cloud. However, it may be particularly convenient that all components of control system 19 will be locally located in or on respirator mask 14, e.g. in an electronics module provided for that purpose.

Control system 19 can comprise any components and/or functionalities (e.g. data-storage memory, wireless transmitters and receivers, and so on) as needed in order to operate camera 18 and micro-display 30, to process the images captured by camera 18 and communicate them to micro-display 30, to interact with a user of the thermal imaging system, and so on. Other electronic components (e.g. an accelerometer 21 and/or a microphone 22, as discussed later) may be present in or on respirator mask 14 and may also be operated by control system 19. Control system 19 may comprise any suitable items as needed, e.g. power switches, one or more other mechanical or virtual switches or controls to allow the user to govern various aspects of the operation of the thermal imaging system (e.g. the sensitivity level of the thermal imaging camera and the brightness level of the micro-display), and so on. Various other items may be present. For example, a subsidiary processor and/or circuit board may be present whose function is to operate micro-display 30; camera 18 may similarly comprise a subsidiary circuit board, processor, or the like, whose function is to operate camera 18. Control system 19, camera 18, and micro-display 30 may all be provided with electrical power from a suitable power source. In various embodiments, a single power source may be used to power all such items; however, in some embodiments one or more of these items may be provided with an individual power source, e.g. a battery.

The above is not meant to be an exhaustive description of all of the various items, components, and functionalities that may be present in a thermal imaging system or in a thermal imaging camera or a micro-display thereof. Thermal imaging systems, in particular systems with in-mask display units as may find use with respirator masks, are described in detail in U. S. Patent Application Publication 2019/0118008; and, in U.S. Provisional Patent Application 62/745,154 and in the resulting PCT Application published as WO 2020/075045, all of which are incorporated by reference in their entirety herein.

Figure 3:
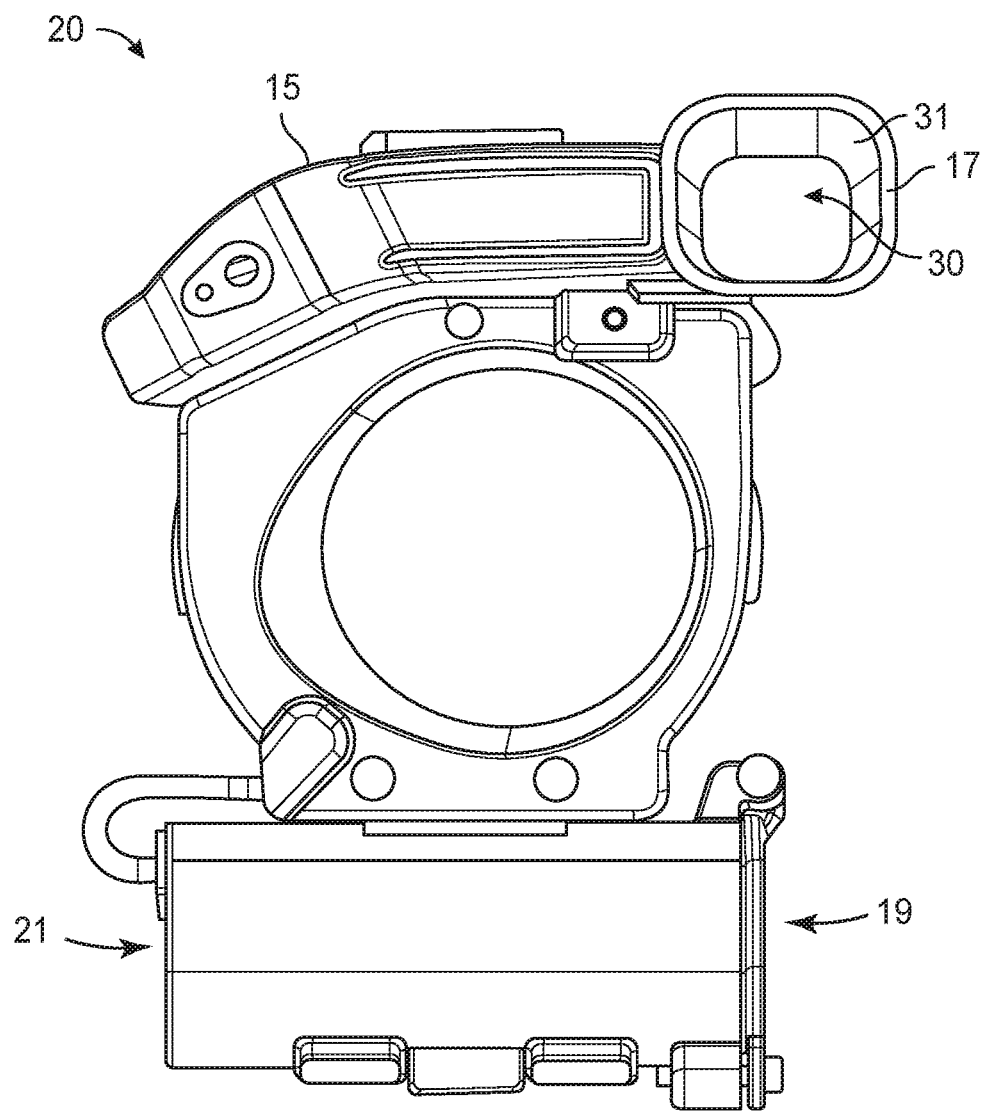
FIG. 3 is a rear perspective view of the exemplary facepiece and in-mask display unit of FIG. 2, looking forward along the line of sight of a wearer of the respirator mask so that an in-mask micro-display of the in-mask display unit is visible.

A wearer of a respirator mask 14 comprising a thermal imaging system 1 with an in-mask display unit 20, when looking forwardly (e.g. through lenses 31 and 32) into the micro-display 30 of the display unit in a view similar to that shown in FIG. 3, can be presented with thermal imaging information of the general type shown in exemplary illustration in FIG. 4. In the example of a firefighter wearing respirator mask 14 comprising a thermal imaging system 1 (e.g. in the manner shown in generic illustration in FIG. 5), the thermal imaging camera 18 can capture a thermal image 50 that generally corresponds to the visible-light scene that the firefighter is observing through the pane of the mask. This captured image 50 is then transformed by the control system 19 into an image 60 that is presented on the in-mask micro-display 30, that is representative of the relative temperature of the objects in the image. Thermal imaging systems are typically configured so that objects of higher temperature (e.g. the person shown FIG. 4) are shown in lighter shades (e.g. light-grey to white) and objects of lower temperature are shown in darker shades, e.g. dark-grey to black. In some instances other colors may be used e.g. as overlays; for example, in some instances the highest-temperature object in the displayed image may have a false-color (e.g. red) indicia superimposed on it.

In conventional approaches in the art, the image 60 that is shown on the in-mask micro-display 30 will closely match the image 50 that is captured by the thermal imaging camera 18, as in the exemplary illustration of FIG. 4. That is, typically no portion of captured image 50 (e.g. a portion along the top, bottom, left or right of the image) will be cropped, trimmed, or otherwise removed in the process of generating displayed image 60. In other words, in conventional uses of such thermal imaging systems, no more information is captured by camera 18 than is displayed on in-mask micro-display 30.

A thermal imaging system with a wearable thermal imaging camera and an in-mask display unit can enhance the information that is available to, for example, a firefighter. Furthermore, this can be achieved in a hands-free manner. Such a thermal imaging system may be particularly useful in a process of "overhauling", which is the process of assessing an extinguished fire (strictly speaking, a possibly-extinguished fire), to detect and locate any remaining smoldering items, latent flames or fire extensions. For example, the thermal imaging system may detect a "hot spot" on a wall or ceiling that is indicative of a possible fire extension behind the wall or ceiling. Beyond this, in general such a thermal imaging system can enhance the situational awareness that can be achieved by a firefighter in various aspects of dealing with fires and their aftermath. Such a thermal imaging system may also be useful e.g. in search and rescue operations.

As discussed earlier herein, an in-mask display unit will need to be small to avoid obstructing the user's view through the pane of the mask. Conventionally, such units (e.g. in which images emitted by a micro-display are enlarged somewhat by one or more lenses) have been adequate to handle the captured images sent by a wearable thermal imaging camera. However, it is envisioned that wearable thermal imaging cameras may become available that offer a larger field of view and which thus may capture more information than can easily be shown on a conventional in-mask display unit. The situation may be compounded by the fact that it is often desirable to devote a portion of the micro-display to showing other information in addition to the thermal image. For example, as shown in exemplary manner in FIG. 4, portions of micro-display 30 may be reserved for showing symbol 42 representing the remaining capacity of an air tank and symbol 43 representing the remaining battery life. In many instances, various other information may also be shown.

Figure 5:
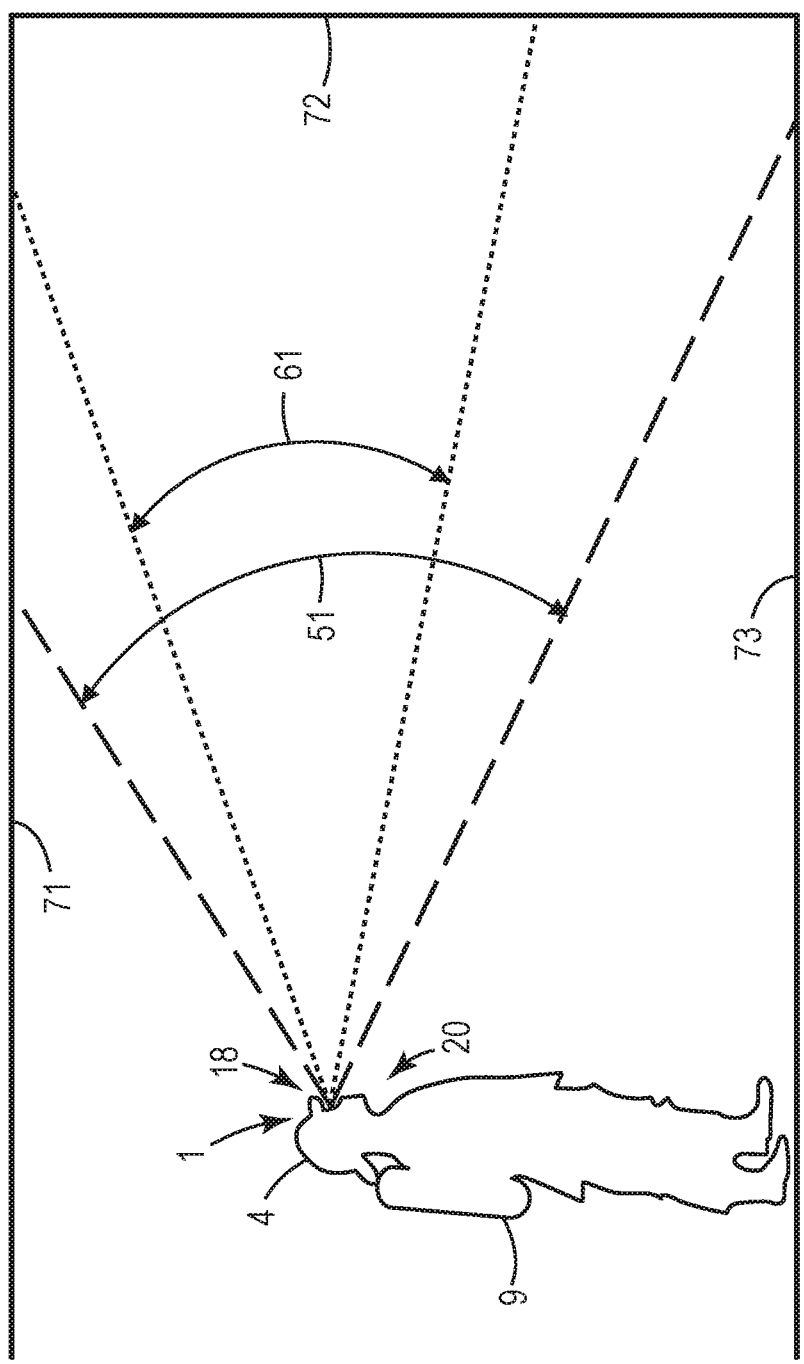
FIG. 5 is a side view showing, in generic representation, fields of view capturable by a thermal imaging camera and displayable by an in-mask display unit.

This potential mismatch between the images that can be obtained by a wearable thermal imaging camera, and the images that can be easily shown in an in-mask display unit, means that improved thermal imaging cameras with a greater field of view may not be used to full advantage, absent the arrangements disclosed herein. By way of a specific exemplary scenario, FIG. 5 depicts, in generic representation, a firefighter using a thermal imaging system 1 that has a wearable thermal imaging camera 18 and an in-mask display unit 20 comprising a micro-display. As the firefighter looks forward (and slightly upward, in the depicted scenario) the thermal imaging camera 18 may be able to capture a wide field of view 51 that may encompass not only far wall 72, but also a considerable portion of ceiling 71 and floor 73. In contrast, the in-mask display unit 20 may be only able to show a resulting image that encompasses a smaller field of view 61 that does not include e.g. as much of the floor 73 or ceiling 71. This extra information may be lost, absent the arrangements disclosed herein.

FIG. 5 illustrates this phenomenon with regard to a vertical field of view, but it will be appreciated that similar issues can be present with regard to the horizontal field of view captured by the camera, in comparison to the horizontal field of view that the in-mask display unit is able to show. It will also be appreciated that the limitation on the ability of the in-mask display unit to show images of a desirably large field of view is not necessarily a result of any technical limitation in the optical functioning of the micro-display. Rather, the issue is that the necessarily small size of the in-mask display unit prevents any large camera-acquired image from simply being shrunk until it can be shown in the display unit, because the resulting image would be too small for the user to see sufficient detail in the image. (For example, a firefighter might desire to be able to see a hot spot that may be only a few inches in size, even at a distance of e.g. 5 meters.) Thus, even if a thermal imaging camera is available that can capture an image at, for example, a 5 meter distance with a field of view of 120 degrees, for any useful details to be discernable in the resulting displayed image, the image as shown in the display unit may have to be cropped until it spans only e.g. 80, 60, or 40 degrees. The issue is thus one of basic geometry rather than any fundamental technical limitation in the display, and the difficulty cannot be overcome merely by using a high resolution display, for example. Such issues also cannot be overcome by increasing the size and/or focal length of any lenses used in the in-mask display unit, in view of the severe constraints imposed by the limited space inside the respirator mask, the need to maintain adequate eye relief (the distance between the ocular lens and the user's eyeball), and so on.

One specific example in which useful information may go unused due to display size limitations is illustrated in FIGS. 6a and 6b. FIG. 6a shows an exemplary image 50 as captured by a wearable thermal imaging camera that is capable of acquiring images at a wide field of view. When image 50 is processed and sized to fit on an in-mask micro-display 30 so as to be presented in an in-mask display unit 20, a significant portion 53 of the original image 50 may be discarded and thus not shown in displayed image 60, as is evident in FIG. 6b. In some instances, the unshown portion 53 may contain information that might be of use to the user, for example the fact that portion 53 includes a hot spot 74.

The particular scenario shown in FIGS. 6a and 6b, in which the portion of a captured image that is not shown in the displayed image is an upper portion, can be of particular importance. This is because when monitoring for latent flames or fire extensions, the ceiling can be of particular importance. A second reason is that the ability of a firefighter to rotate their head backward to allow a captured and/or displayed image to encompass much of the overhead ceiling, can sometimes be limited. For example, as shown in FIG. 5, in some instances the rear bill of a firefighter's helmet 4 may contact the top of an air tank 9 in such manner as to limit the extent to which the firefighter can tilt their head back. It can thus be useful that the uppermost portions of captured thermal images be used to the maximum possible extent, to alleviate such issues. This being the case, many of the exemplary scenarios and embodiments that are presented later herein will concern the manipulation of uppermost portions of captured thermal images. However, it is emphasized that the arrangements and methods demonstrated in these scenarios can be applied to any portion (e.g. a lower, right, or left portion); and, indeed, to multiple such portions, of an image.

Figure 7A:
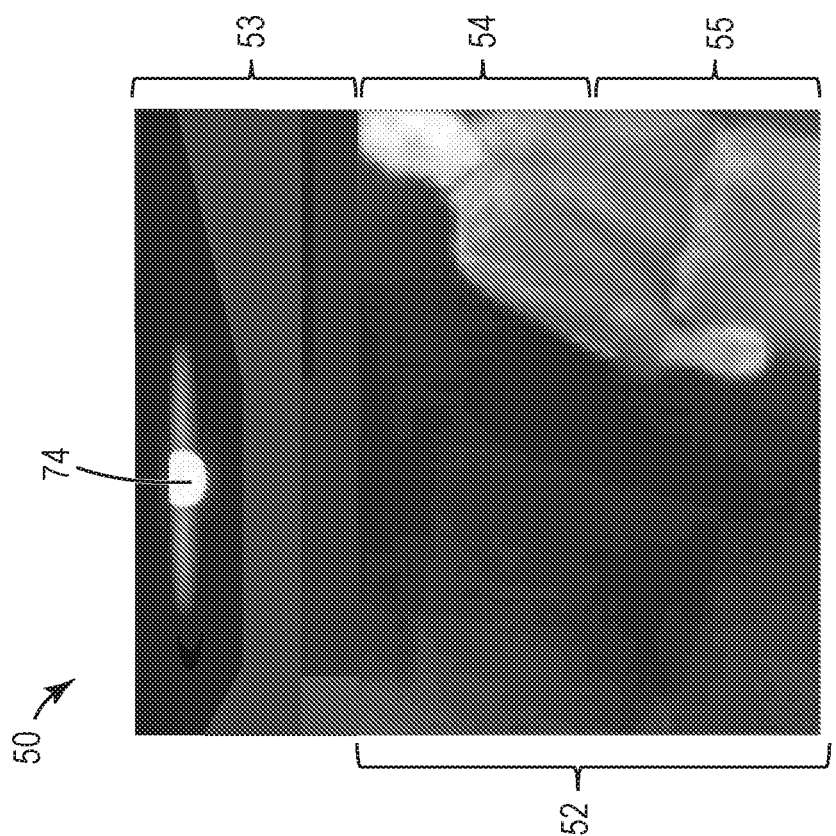
FIGS. 7a and 7b respectively depict an image captured by a thermal imaging camera, and another exemplary display scenario of the resulting image as shown on an in-mask micro-display.

In view of the above-discussed considerations, herein is disclosed a view-shifting arrangement that can allow an additional amount (e.g. essentially all) of the information that is captured by a wearable thermal imaging camera to be made available to a user as needed. Stated briefly, this view-shifting arrangement apportions an image 50 that is captured by a wearable thermal imaging camera, into a primary subimage 52 and at least one secondary subimage 53, as shown in FIG. 7*a*. The thermal imaging system will, in the main, operate in a "default view" in which primary subimage 52 is shown on micro-display 30. Thus, in this examples and examples to follow, when the system is in default view the image shown on the micro-display will correspond to image 60 as shown in FIG. 6*b*.

According to the arrangements presented herein, the thermal imaging system will be configured so that upon the control system 19 of the thermal imaging system receiving an input, it will shift the micro-display 30 from the default view to an auxiliary view. This shifting to an auxiliary view will cause at least a portion of the primary subimage 52 to be directionally displaced by at least a portion of the previously-unshown secondary subimage 53. Thus in the example of FIGS. 7*a* and 7*b*, portion 55 of primary subimage 52, which portion was previously visible in the default-view image (i.e., the image of FIG. 6*b*), is no longer seen when in auxiliary view, while previously-unseen secondary subimage 53 is now visible when in auxiliary view.

Directional Displacement

By "displaced" is meant that in auxiliary view, a portion of the primary subimage that was previously shown in default view is either moved or removed so that in auxiliary view, the secondary subimage will occupy the area of the micro-display that was previously occupied by the to-be-displaced portion of the primary subimage. Thus starting from the default view of FIG. 6*b*, when the shift is made to auxiliary view, portion 54 of subimage 52 is displaced downward on the micro-display with secondary subimage 53 being shown in the area previously occupied by portion 54. This is thus an example in which a portion 54 of a primary subimage 52 is displaced by being moved while remaining visible on the micro-display; portion 54 has in turn displaced portion 55, which is now no longer visible.

By "directionally" displaced requires more than merely a portion of a primary subimage being replaced by a secondary subimage. Rather, by this is meant that, in auxiliary view, the secondary subimage is shown on the micro-display in such manner as to indicate the particular direction (e.g. up, down, left or right) that the secondary subimage is located relative to the primary subimage in the original captured image. One straightforward way to do this is, as in FIG. 7*a*, to show the secondary subimage in a location that is proximate the boundary beyond (above, in this case) which the secondary subimage was located in the original captured image. To generalize, if, in the original captured image, a secondary subimage is located beyond an upper, lower, left or right boundary of a primary subimage, upon the directional displacing of a portion of the primary subimage by the secondary subimage, the secondary subimage can be shown on at least a section (area) of the in-mask micro-display that previously showed the to-be-displaced portion of the primary subimage. This area of the micro-display will be an area that is located proximate to the boundary of the subimage beyond which the secondary subimage was located in the captured image.

Directional displacement as defined herein occurs purely by way of manipulation and processing of images. Thus by definition, directional displacement as defined herein is distinguished from a change in displayed images that results from physically moving a camera (e.g. panning, tracking, or tilting). It will also be appreciated that directional displacement of a portion of a primary subimage by a secondary subimage as disclosed herein is distinguished from, for example, previously-unseen image portions becoming visible in the act of zooming out from a close-up view so that a larger view is visible, whether such zooming out is accomplished by physically changing the focal length of the camera, or by processing of the images.

Figure 7B:
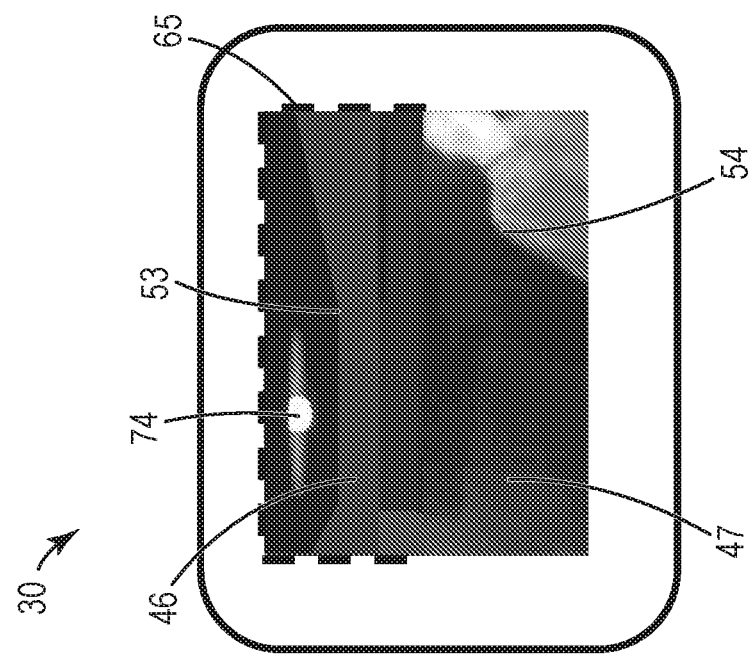

Another useful feature is visible in FIG. 7*b* as item 65. Item 65 is an indicia that is presented by micro-display 30, and that can serve any or all of several functions. First, indicia 65 can serve as a status notification that the thermal imaging system is now in auxiliary view. Second, indicia 65 can identify the secondary subimage and distinguish it from the still-shown portions of the primary subimage. Third, indicia 65 can point out the location of the secondary subimage (in particular, indicia 65 can make it clear which boundary of the primary subimage the secondary subimage was located beyond, in the original captured image). Such an indicia can take any suitable form. In the exemplary illustration of FIG. 7*b*, indicia 65 takes the form of a dashed-line border that laterally flanks, and upwardly bounds, the secondary subimage 53. Other forms of indicia 65 are possible, some of which are presented in examples later herein.

It will be appreciated that the arrangement depicted in FIG. 7*b* is one in which upon the insertion of subimage 53 in an upper area 46 of micro-display 30, the previously-shown primary subimage 52 is simply scrolled down so that portion 55 (previously visible in FIG. 7*a*) disappears off the bottom of the micro-display and portion 54 moves down to occupy a lower area 47 of the micro-display that was formerly occupied by portion 55. (This can be confirmed by comparing FIG. 7*b* to the default view shown in FIG. 6*b*). This mode of presenting an auxiliary view has the feature that the uppermost portion 54 of the original default-view image is still visible on the micro-display, along with the newly-presented secondary subimage. This mode also has the feature that it shows secondary subimage 53 and portion 54 of primary subimage 52 as a contiguous image that approximately matches how they would actually appear if the person were to aim the thermal imaging camera further upward (e.g. by tilting their head further back, if this were possible). Some users may prefer such a mode.

Figure 8B:
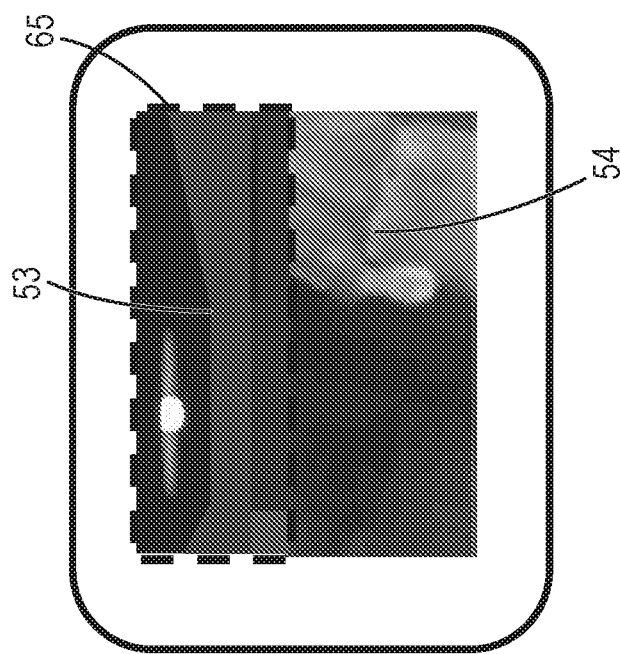
FIGS. 8a and 8b respectively depict an image captured by a thermal imaging camera, and another exemplary display scenario of the resulting image as shown on an in-mask micro-display.
Figure 8A:
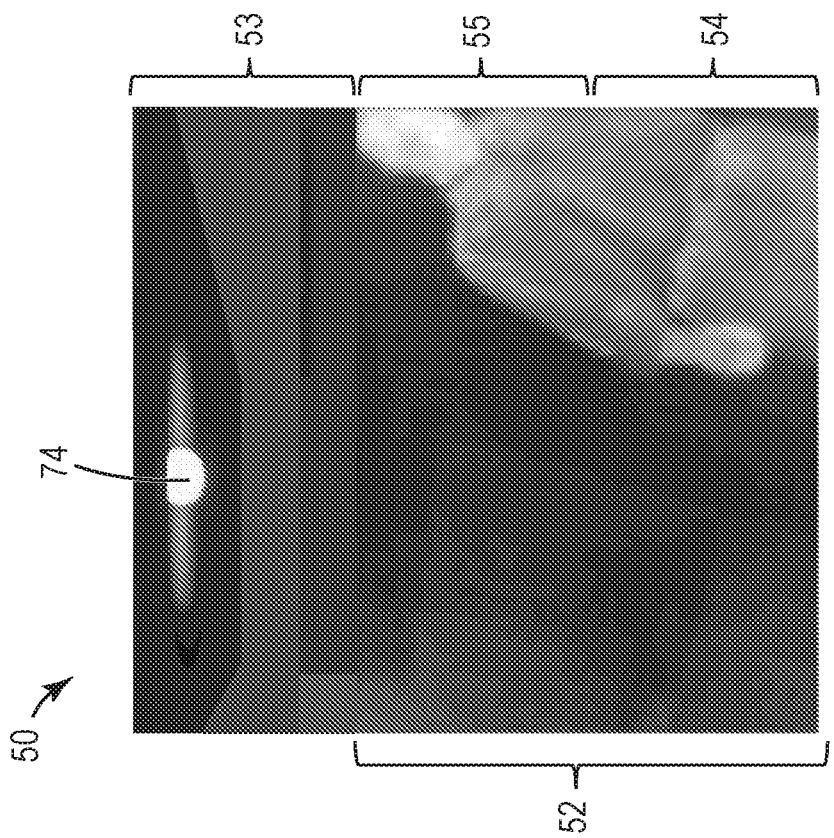

FIGS. 8*a* and 8*b* illustrate another exemplary mode of presenting an auxiliary view. In this mode, when auxiliary view is entered, secondary subimage 53 replaces previously-seen portion 55 of the primary subimage in the upper area of the micro-display, with previously-seen portion 54 remaining visible on the lower area of the micro-display. Previously-seen portion 55 is thus no longer visible when in auxiliary view. This mode of presenting an auxiliary view has the feature that portion 54 as shown on the micro-display generally corresponds to the actual location of this portion as found in the originally captured image, and thus generally corresponds to portion 54 as visible to the person through the pane of the respirator mask. Some users may prefer such a mode. An indicia 65 indicating that the system is in auxiliary view, and showing the location of the secondary subimage 53, is also visible in FIG. 8b. In this case, the indicia is a box that surrounds the entirety of subimage 53.

Figure 9B:
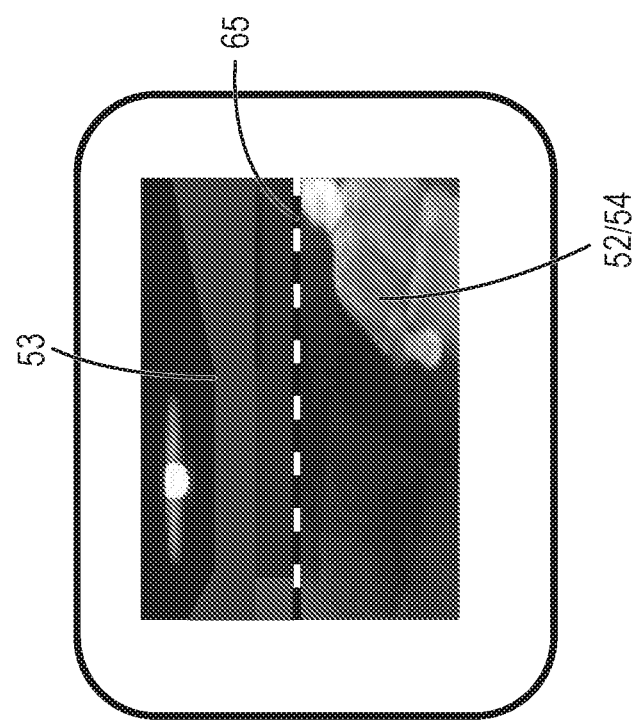
FIGS. 9a and 9b respectively depict an image captured by a thermal imaging camera, and another exemplary display scenario of the resulting image as shown on an in-mask micro-display.
Figure 9A:
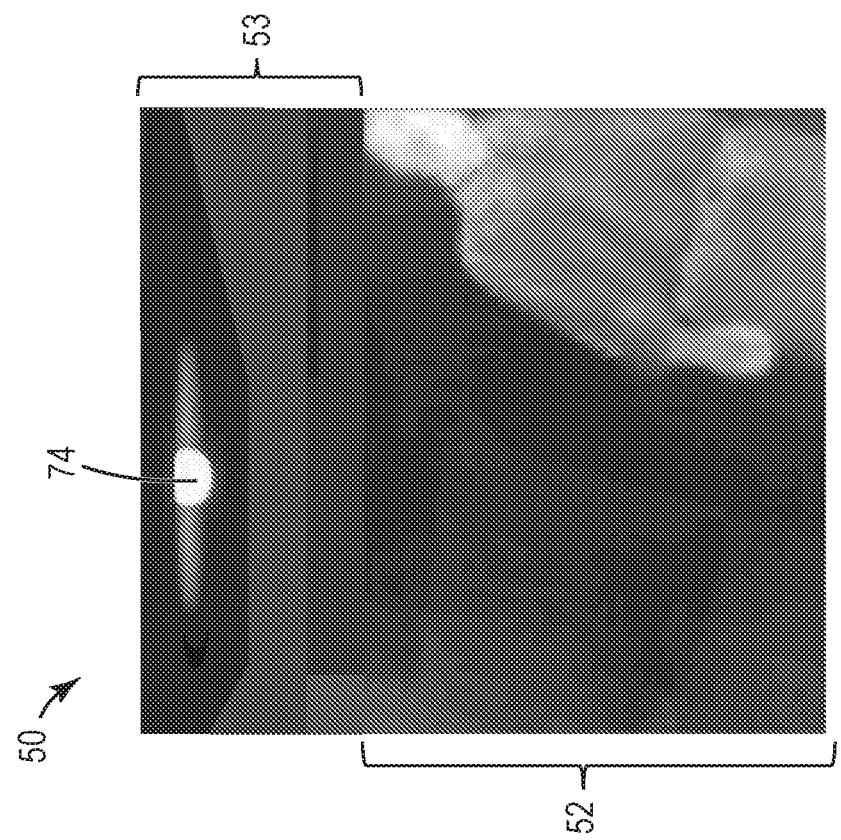

FIGS. 9a and 9b illustrate another exemplary mode of presenting an auxiliary view. In this mode, primary subimage 53, which in default view occupied the entirety of the usable area of micro-display 30, is compressed at least somewhat when auxiliary view is entered. Thus in such a mode, most, or even the entirety (as in FIG. 9b), of primary subimage 53 is still visible, albeit in compressed form. (In the exemplary arrangement of FIG. 9b, the compression is along the vertical axis only, thus primary subimage 53 is slightly distorted from its original appearance.) In other words, in such an auxiliary-view mode the retained portion 54 of primary subimage 52, can comprise most, or essentially all, of primary subimage 52. This mode of presenting an auxiliary view has the feature that much or even all of the originally-shown primary subimage 52 can be still be shown in auxiliary view (albeit in compressed and/or distorted form). Some users may prefer such a mode. An indicia 65 indicating that the system is in auxiliary view, and showing the location of the secondary subimage 53, is also visible in FIG. 8b. In this case, the indicia is a line that demarcates the boundary between the lower edge of secondary subimage 53 and the upper edge of primary subimage 52.

It will be appreciated that a herein-disclosed thermal imaging system may be configured with any of the above-described auxiliary-view modes. In some embodiments, the system may be configured so that a user can choose between such modes, according to the user's preference.

In another mode of presenting an auxiliary view (not shown in any Figure), a secondary subimage 53 can replace most, e.g. essentially all, of the previously-shown primary subimage 52. That is, in such embodiments the secondary subimage may occupy the entirety of micro-display 30 (by this is meant the entire area of micro-display 30 that is usable for displaying a thermal image, not counting any areas that are dedicated to e.g. showing other parameters such as air tank remaining capacity, battery life, and so on, as noted earlier). This mode of presenting an auxiliary view has the feature that it allows a maximum extent of a secondary subimage to be presented; however, it may deprive the user of the entirety of the previously-seen primary subimage. Accordingly, in some embodiments, if such a mode is used, the system can be configured so that the secondary subimage is only shown for a short, e.g. pre-selected, amount of time (e.g. for a few seconds), after which the system may revert to the default view. Although in such a mode it may not be necessary to provide any indicia that distinguishes the secondary subimage from the primary subimage (since the subimage may not be visible), one or more indicia can still be provided that notify the user that the system is in auxiliary view and/or that indicate the direction that the secondary subimage was located relative to the primary subimage, in the original captured image. Thus for example, if the secondary subimage was located above the primary subimage, an upward-pointing arrow 65 can be used as such an indicia, in the general manner shown in FIG. 10b.

As noted, the herein-disclosed thermal imaging system will shift from default view to auxiliary view upon the control system receiving an input. In general, such an input can originate from the user of the system, from sensory input obtained from a sensor of the thermal imaging system itself, or from some combination of both.

In some embodiments, the switch from default view to an auxiliary view can occur via input that is, or includes, a voice command from the user of the system, e.g. by way of an in-mask microphone 22 as indicated generally in FIG. 1. Any suitable set of voice commands may be used, and may include one or more words (e.g. "camera") that notify the system that the word string is in fact a command. For example, such a voice command could be "camera up" to have the system switch to an auxiliary view that shows a previously-unseen subimage that is above the primary subimage, "camera left" to switch to a previously-unseen subimage that is left of the primary subimage, and so on. The system can be triggered to enter voice command mode by way of a physical switch; or, in some embodiments, the system may remain at-the-ready (with the in-mask microphone constantly live) so that it can enter voice-command mode upon receiving a suitable word string (e.g. "arm voice-command").

In some embodiments, the switch from default view to an auxiliary view can occur via input that is derived from accelerometer data, e.g. by way of an accelerometer that is located somewhere in or on the respirator mask. (An exemplary possible location for such an accelerometer is indicated generally in FIG. 2.) In some embodiments, such input may take the form of accelerometer data that indicates that the respirator mask is in an orientation that indicates that an auxiliary view is desired by the wearer of the respirator mask. For example, accelerometers are available that can monitor the orientation of an item (e.g. a mask) in which the accelerometer is installed, relative to the earth's gravity. Such an accelerometer can thus detect whether, for example, the wearer of the mask appears to be tilting their head back to an angle that indicates that the wearer desires to see an auxiliary view of a secondary subimage that is vertically above the primary subimage shown in default view. Thus, for example, with reference to FIG. 5, if the accelerometer reports that the respirator mask is tilted upward/rearward e.g. to an angle of 10, 20, or 30 degrees beyond the normal vertically-upright position of the wearer's head and the respirator mask, this may be taken as an indication that the wearer wants to display an auxiliary mode that shows more of the ceiling.

In some embodiments, the specific positional parameter (e.g. in terms of atilt angle of the respirator mask) that triggers entry into auxiliary view can be set to a specified threshold (whether as a value that is fixed by the system, or is chosen by the user from a menu of choices). In some embodiments the system may need to be purposefully put into a state (by voice command or other input from the wearer) in which it is responsive to this type of accelerometer input, e.g. so that undesired activations of the auxiliary view do not occur in the course of head movements during firefighting activities. Similarly, in some embodiments the system may be configured so that auxiliary view is not entered until the head has been held at or beyond a specified tilt angle for at least a pre-chosen length of time (e.g., 2, 3, or 4 seconds), again so that momentary movements of the head do not cause an undesired activation of auxiliary view. It will be appreciated that many variations are possible; in some embodiments, the specific triggering values of any such parameters can be user-selectable. For example, the system may be configured to recognize a specified set of head movements, in a specified order, as being a signal to enter auxiliary view. In some embodiments, the control system may include logic circuits so that the system can be "trained" e.g. to recognize certain movements of a particular user's head, to distinguish purposeful signals from other head movements, and so on.

In some embodiments, the functioning of such an accelerometer-based control scheme may be augmented e.g. by the presence of a magnetometer to further enhance the ability to monitor orientation e.g. relative to the earth's magnetic field, and/or a gyroscope, to enhance the ability to monitor orientation and movement.

In some embodiments, the switch from default view to an auxiliary view can occur via input that results from the detection, in the secondary subimage, of at least one hot spot. As noted earlier, a hot spot is a location or item that, according to the thermal image captured by the thermal imaging camera, seems to be noticeably hotter than the surrounding environment. In some embodiments, the system may be configured to obtain an estimation of the temperature of the hot spot, and to factor in this information. Thus for example, a switch to auxiliary view may only be triggered if the estimated temperature of the hot spot is greater than a pre-determined threshold temperature (e.g. 200, 500, 800 or 1000 degrees F.).

This arrangement recognizes that even if, in default view, the extra information that is present in a secondary subimage that is not shown to the user in the displayed image, this information is still available to the control system 19. The control system can thus evaluate the secondary subimage and, if a hot spot is detected, can trigger a change to auxiliary view. Thus for example, the presence of a hot spot 74 as shown in FIG. 7a, can cause the system to trigger a change to auxiliary view (which may take the form of any of the examples shown in FIGS. 7b, 8b, and 9b; or, as noted, can take the form of completely replacing the primary subimage with the secondary subimage for some appropriate length of time).

Figure 10B:
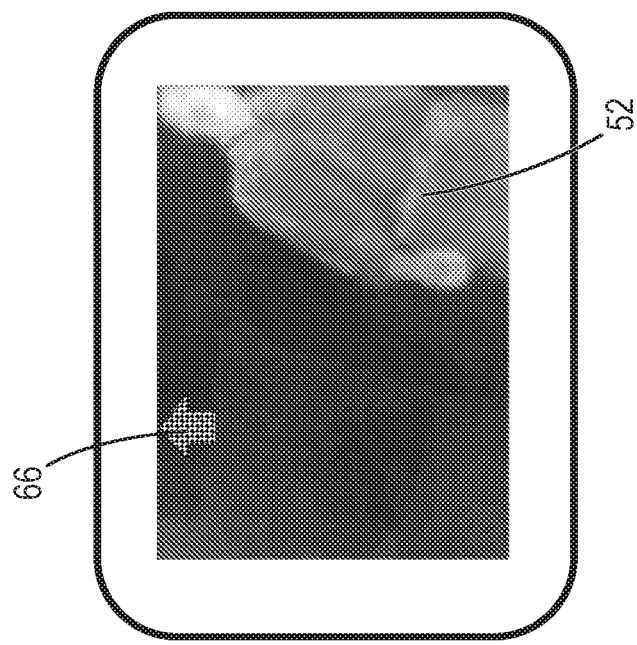
FIGS. 10a and 10b respectively depict an image captured by a thermal imaging camera, and another exemplary display scenario of the resulting image as shown on an in-mask micro-display.
Figure 10A:
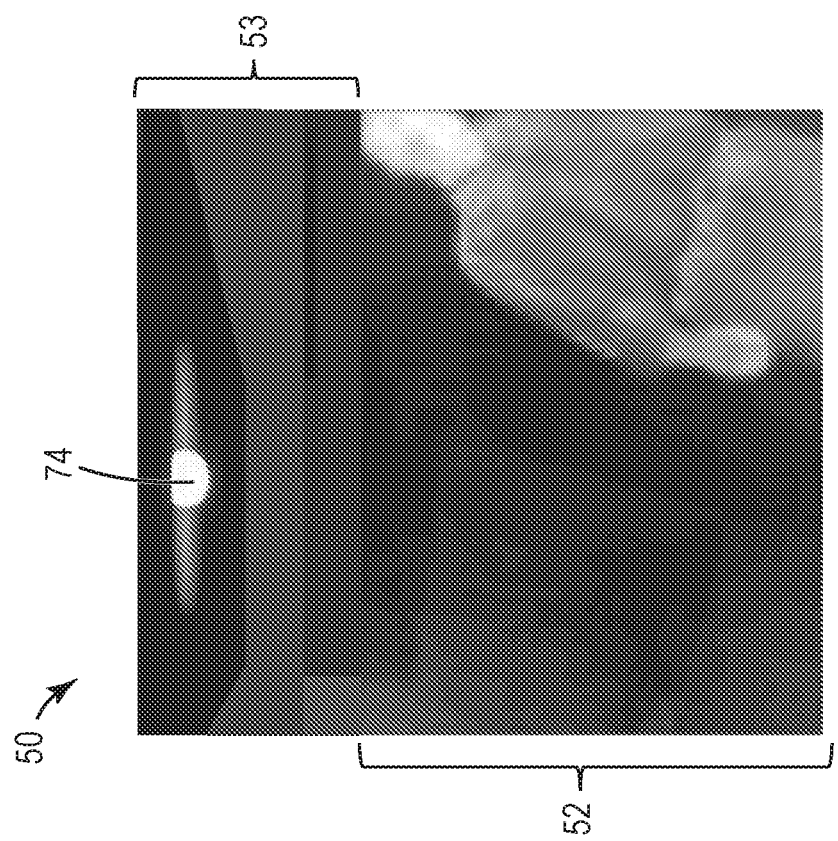

The ability to perform hot spot detection enables other arrangements and modes of operation. For example, with reference to FIGS. 10a and 10b, the detection of a hot spot 74 in a secondary subimage 53 can trigger (rather than e.g. an immediate switch to auxiliary view) the presentation of an indicia 66 as shown in FIG. 10b. Indicia 66 is shown while the system is still in default view, and indicates that a hot spot has been detected in a secondary subimage. Indicia 66 can also be configured, for example by way of its location in the micro-display and/or by a direction that the indicia indicates e.g. by pointing, to indicate the direction that the hotspot is located relative to the displayed primary subimage. In the exemplary arrangement of FIG. 10b, indicia 66 uses both methods; i.e. the indicia is positioned at the upper left boundary of the micro-display and points upward toward the location of hotspot 74.

Upon the presentation of such an indicia, the user can, if desired, issue a command (e.g. a voice command, or by any other suitable method) for the system to enter auxiliary view, so that the subimage that contains the hot spot can be visualized on the in-mask display unit.

It will be appreciated that the ability to perform hot spot detection can allow the above-described functionalities to be implemented in a variety of ways, some of which may be customizable by a user. For example, the system may be configured so that indicia 66 provides an indication not only the location of the hot spot, but also the estimated temperature of the hot spot. This may be done e.g. by modifying the size, color, or some other aspect of the appearance of indicia 66, as a function of the estimated temperature of the hot spot. If multiple hot spots are detected (whether in a single subimage or in multiple subimages surrounding the primary subimage, in the event that such multiple subimages are obtained by the thermal imaging camera being used), multiple indicia may appear. The multiple indicia may differ according to the estimated temperature of the various hot spots.

The ability to perform hot spot monitoring allows still further modes of operation. For example, the system may be configured to detect hot spots in the primary subimage. Thus with reference to FIG. 11a, in some embodiments a hot spot 75 may be detected in primary subimage 52. In such a case, when the system enters auxiliary mode, a secondary subimage 53 that is shown on micro-display 30 may be purposefully placed in a location that does not obscure the hot spot 75. Thus, as shown in FIG. 11b, a secondary subimage 53 (or at least a portion thereof) can be shown so that the presence of a hot spot 74 is revealed in the secondary subimage, but with the secondary subimage being placed in a location in which it still leaves hot spot 75 of primary subimage 52 visible on-screen. Rather, secondary subimage 53 can be positioned at a location which control system 19 evaluates as containing the least information. As the stream of images continues to be processed, secondary subimage 53 may be moved to a new location as needed.

Thus in such embodiments, a secondary subimage 53 may be shown on micro-display 30 as a "floating" subimage that can move about to various locations on micro-display 30. In such cases, indicia 66 may be a directional indicia that indicates (e.g. by pointing, as in FIG. 11b) the direction that the secondary subimage is found relative to the primary subimage, in the original captured image. In some such cases, directional indicia 66, rather than simply indicating that the secondary subimage is e.g. above the primary subimage, may generally indicate the position of the actual hot spot 74 in the secondary subimage, as in FIG. 11b. In any event, such an arrangement still qualifies as involving a directional displacement of a portion of a primary subimage 52 by a secondary subimage 53.

Still other arrangements are possible. For example, although the above discussions have mainly focused on detecting one or more hot spots, in some embodiments the thermal imaging system may be configured to detect one or more cold spots (e.g. an item that seems to be at a colder temperature than any other item in the image).

Any suitable thermal imaging camera that is capable of an enhanced (wide) field of view (sometimes referred to as angle of view) may be used. Many such thermal imaging cameras are based on sensors comprising uncooled amorphous silicon or vanadium oxide microbolometers, and are available with a total pixel count of from 20000 up to or exceeding 70000, and at a pixel size down to e.g. 12 μm. As used herein, the term wide-angle field of view denotes a thermal imaging camera that has at least one direction (e.g. vertical or horizontal) in which the camera exhibits a field of view of at least 65 degrees and can thus capture an image having at least this field of view. In various embodiments, such a thermal imaging camera may become available with a field of view, in at least one direction, of at least 80, 90, 100, 110, 120 or 130 degrees, or even higher. Some such thermal imaging cameras rely on sensors that have more pixels along one direction than along a perpendicular direction (e.g. a pixel layout of 160×120) and thus may exhibit a larger angle of view in one direction than in a direction perpendicular to that. Such sensors are often configured so that the pixel rows are longer than the pixel columns, so that the horizontal field of view of the thermal imaging camera is greater than the vertical field of view.

However, for the present use, a thermal imaging camera may be mounted (e.g. on a respirator mask) so that the largest field of view is along the vertical axis, if this is desired. In fact, in some embodiments, the thermal imaging camera may be mounted so that the camera can be physically rotated 90 degrees (e.g., between landscape and portrait orientations), so that a wider field of view can be obtained in the horizontal direction or in the vertical direction, according to the desires of the user. In some related embodiments, the eyepiece of the in-mask display unit may be rotatable (along with the lenses and micro-display mounted therein), so as to match the long direction of the micro-display to the long direction of the thermal imaging camera. The control system 19 can be straightforwardly programmed to handle such options and to present the image on the micro-display in the correct orientation.

Figure 12:
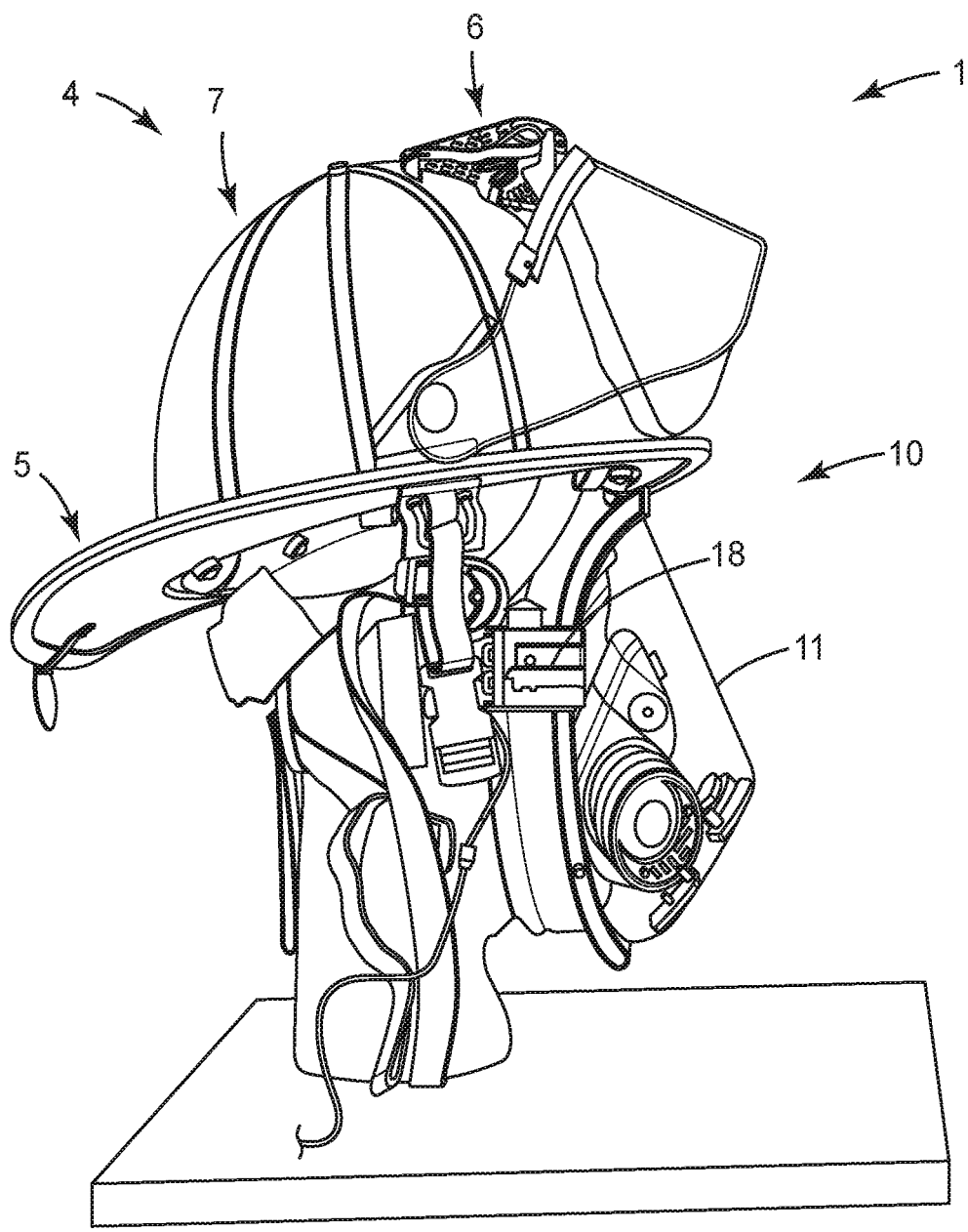
FIG. 12 is a side-rear perspective view of an exemplary respirator mask assembly and a firefighting helmet configured to be worn in combination with the respirator mask assembly.

It will be appreciated that many variations on the above-described arrangements are possible. For example, rather than wearable thermal imaging camera 18 being mounted on a respirator mask as in FIGS. 1 and 12, wearable camera 18 may be placed in any other suitable location on any other garment or item that is worn by the user of the respirator mask. For example, camera 18 might be affixed to a protective coat, or to the brim of a protective helmet, that is worn by the user. In such embodiments, it may be most convenient for the camera to be configured to communicate wirelessly with control system 19 and micro-display 30. In many embodiments such a thermal imaging camera will typically be positioned so that it faces generally forward so that the user can see an image in micro-display 30 that at least generally corresponds to the visible-light view that the user sees through the pane of the respirator mask.

However, the arrangements disclosed herein allow the use of additional thermal imaging cameras if desired. Thus in some embodiments, one or more additional thermal imaging cameras may be provided e.g. at location 5 on the rear brim of the protective helmet 4; or, on the front crown 6, or the rear crown 7, of helmet 4. Thus in some such embodiments a primary subimage may be obtained from a first, generally forward-facing thermal imaging camera; and, a secondary subimage may be obtained from a second thermal imaging camera that may face e.g. generally rearward, upward, rearward/upward, to one lateral side or another, and so on. This is thus a special case of the herein-disclosed arrangement, in which a secondary subimage is not necessarily required to come from the same captured image as a primary subimage. It is also noted that in general, a secondary subimage that is shown in auxiliary view does not necessarily have to include the entirety of the portion (or portions) of a captured thermal image that was not shown in default view. However, in some embodiments it may do so.

Although not discussed previously herein, it is noted that if desired, in some embodiments the system may be configured so that a primary subimage and/or a secondary subimage may be zoomed in (magnified) or zoomed out (shrunk). Typically, any such zooming in or out will be performed by way of the control system manipulating the stream of images rather than by way of e.g. mechanically changing the focal length of the thermal imaging camera. In some embodiments any such operation may be independent of, and controlled independently of, the above-disclosed arrangements, e.g. by voice command. However, if desired, in some embodiments such zooming may occur in combination with the herein-disclosed arrangements. For example, the system may be configured so that when a secondary subimage is displayed that comprises e.g. only a single, rather small, hot spot, the system may automatically zoom in so the portion of the subimage that includes the hot spot is magnified. Again, it will be appreciated that the thermal imaging system may offer many of these modes and functionalities as options that can be chosen between, depending e.g. on circumstances and user preference. Although it may typically not be preferred, the system may be configured to allow the user to specify that the entirety of the captured thermal image is shown on the micro-display for at least some prechosen period of time. That is, even with the loss of detail that may result from the compression of the entire captured thermal image to fit on the micro-display, the user may still desire to see the entire image for some particular purpose, on occasion.

It is noted that if zooming is used in combination with the arrangements disclosed herein, in some embodiments an image as initially captured by the thermal imaging camera may actually occupy a field of view that is less than that which the display unit is capable of presenting to the user. However, upon the image being zoomed (magnified), the zoomed image may occupy an effective field of view (at the effective viewing distance to which the magnification brings the image) that is larger than that which be shown by the display unit. In such cases, the manipulations disclosed herein (directional displacement and so forth) can be applied to the zoomed image. It is thus noted that, strictly speaking, the arrangements disclosed herein can be applied to thermal imaging systems in which the native field of view of the thermal imaging camera is not necessarily less than the maximum field of view of the display unit. In such cases, the arrangements disclosed herein can still apply, but with the field of view of the captured image being understood to be the effective field of view of the captured image after it has been magnified. Thus for example, a thermal imaging camera might capture an image at a field of view of 50 degrees and the system may then zoom the image to an effective viewing distance such that the effective field of view of the zoomed image is 70 degrees. Such an image would qualify as a wide-angle thermal image, as a special case of the definitions previously provided herein.

Although the exemplary illustrations presented herein have all focused on a single, monocular in-mask display unit, in some embodiments a second display unit may be provided, as long as the two display units do not collectively obstruct the user's view through the front pane of the respirator mask. (It will be appreciated that if two such display units are used, they do not necessarily have to be configured to present a stereoscopic image to the user.)

It will be apparent to those skilled in the art that the specific exemplary embodiments, elements, structures, features, details, arrangements, configurations, etc., that are disclosed herein can be modified and/or combined in numerous ways. In summary, numerous variations and combinations are contemplated as being within the bounds of the conceived invention, not merely those representative designs that were chosen to serve as exemplary illustrations. Thus, the scope of the present invention should not be limited to the specific illustrative structures described herein, but rather extends at least to the structures described by the language of the claims, and the equivalents of those structures. Any of the elements that are positively recited in this specification as alternatives may be explicitly included in the claims or excluded from the claims, in any combination as desired. Any of the elements or combinations of elements that are recited in this specification in open-ended language (e.g., comprise and derivatives thereof), are considered to additionally be recited in closed-ended language (e.g., consist and derivatives thereof) and in partially closed-ended language (e.g., consist essentially, and derivatives thereof). Although various theories and possible mechanisms may have been discussed herein, in no event should such discussions serve to limit the claimable subject matter. To the extent that there is any conflict or discrepancy between this specification as written and the disclosure in any document that is incorporated by reference herein but to which no priority is claimed, this specification as written will control.

What is claimed is:

1. A thermal imaging system configured for use with a respirator mask, comprising:
   an in-mask display unit configured to be mounted within an interior volume of a respirator mask and comprising an in-mask micro-display;
   a wearable thermal imaging camera that is configured to capture a thermal image and to communicate at least a portion of the captured thermal image to the in-mask micro-display; and,
   a control system for controlling the in-mask micro-display and the wearable thermal imaging camera,
   wherein the wearable thermal imaging camera comprises a wide field of view so that the captured thermal image comprises at least a primary subimage and a secondary subimage; and, wherein the control system is configured so that the in-mask micro-display presents a default view in which the in-mask micro-display shows the primary subimage of the captured thermal image but does not show the secondary subimage of the captured thermal image; and,
   wherein upon the control system receiving an input to shift the in-mask micro-display from the default view to an auxiliary view, the control system causes at least a portion of the primary subimage to be directionally displaced on the in-mask micro-display by the secondary subimage so that the secondary subimage is now shown in place of the displaced portion of the primary subimage.

2. The thermal imaging system of claim 1 wherein the wearable thermal imaging camera comprises a vertical field of view of at least 90 degrees and wherein the in-mask display unit is configured so that an ocular eyepiece of the in-mask display unit occupies a vertical field of view, relative to an eye of a user of the respirator mask and the thermal imaging system, of 70 degrees or less.

3. The thermal imaging system of claim 1 wherein the input to shift the in-mask micro-display from the default view to an auxiliary view is derived from accelerometer data that indicates that the respirator mask is in an orientation that indicates that an auxiliary view is desired by the wearer of the respirator mask.

4. The thermal imaging system of claim 1 wherein when the in-mask micro- display is in an auxiliary view with the secondary subimage being shown in place of the at least portion of the primary subimage, a status notification indicia is shown on the micro-display notifying the user that the in-mask micro-display is presenting an auxiliary view and identifying the location of the secondary subimage in the in-mask micro-display.

5. The thermal imaging system of claim 1 wherein the system is configured to detect a hot spot exhibiting a temperature greater than a pre-determined threshold temperature in the secondary subimage when the in-mask micro-display is in the default view with the secondary subimage not being shown in the in-mask micro-display; and, wherein the system is configured to notify a user of the presence of the hot spot in the secondary subimage.

6. The thermal imaging system of claim 1 wherein the in-mask display unit comprises a monocular eyepiece inside which the in-mask micro-display is mounted; and, wherein the in-mask display unit further comprises an objective lens and an ocular lens that are mounted in the monocular eyepiece rearward of the in-mask micro-display and that combine with the in-mask micro-display to form an optical pathway to deliver images to a single eye of the user.

7. A respirator mask comprising the thermal imaging system of claim 1, wherein the respirator mask defines an interior volume when fitted to the face of a human user.

8. The respirator mask of claim 7 wherein the wearable thermal imaging camera is configured to be attached to the outside of the respirator mask and is wirelessly connected to the control system.

9. The respirator mask of claim 7, wherein the wearable thermal imaging camera is configured to be attached to a protective helmet or a protective garment that is worn in conjunction with the respirator mask, and wherein the wearable thermal imaging camera is wirelessly connected to the control system.

10. A method of providing thermal images to a wearer of a respirator mask, the method comprising:
    capturing a wide-angle thermal image that comprises at least a primary subimage and a secondary subimage;
    showing the primary subimage on an in-mask micro-display, as a default view that continues until an input to shift the in-mask micro-display from the default view to an auxiliary view is received;
    upon receiving an input to shift the in-mask micro-display from the default view to the auxiliary view, directing the in-mask micro-display to directionally displace at least a portion of the primary subimage with the secondary subimage so that the secondary subimage is now shown in place of the displaced portion of the primary subimage.

11. The method of claim 10 wherein the input to shift the in-mask micro-display from the default view to the auxiliary view is derived from accelerometer data that indicates that the respirator mask is in an orientation that indicates that an auxiliary view is desired by the wearer of the respirator mask.

12. The method of claim 10 wherein the input to shift the in-mask micro-display from the default view to the auxiliary view results from a voice command from the wearer of the respirator mask, via an internal microphone of the respirator mask, that indicates that an auxiliary view is desired by the wearer of the respirator mask.

13. The method of claim 10 wherein the input to shift the in-mask micro-display from the default view to the auxiliary view results from detection, in the secondary subimage, of at least one hot spot with an estimated temperature that is greater than a pre-determined threshold temperature.

14. The method of claim 10 wherein in the wide-angle thermal image, the secondary subimage is located beyond an upper, lower, left or right boundary of the primary subimage and wherein upon the directional displacing of at least the portion of the primary subimage by the secondary subimage in the in-mask micro-display, the secondary subimage is shown on at least a section of the in-mask micro-display that previously showed the to-be-displaced portion of the primary subimage and that is located proximate to the boundary beyond which the secondary subimage was located in the wide-angle thermal image.

15. The method of claim 10 wherein in the wide-angle thermal image, the secondary subimage is located above an upper boundary of the primary subimage and wherein upon the directional displacing of at least the portion of the primary subimage by the secondary subimage, the secondary subimage is shown on at least an upper section of the in-mask micro-display, that previously showed the to-be-displaced portion of the primary subimage.

16. The method of claim 15 wherein upon the directional displacing of at least the portion of the primary subimage by the secondary subimage, the primary subimage is compressed at least along the vertical direction so that the entirety of the primary subimage is shown on a lower section of the in-mask micro-display.

17. The method of claim 15 wherein upon the directional displacing of at least the portion of the primary subimage by the secondary subimage, the portion of the primary subimage that was previously shown on the upper section of the in-mask micro-display is no longer shown on any section of the in-mask micro-display.

18. The method of claim 14 wherein upon the directional displacing of at least the portion of the primary subimage by the secondary subimage, the primary subimage is entirely replaced by the secondary subimage so that the secondary subimage occupies the entirety of the in-mask micro-display for a pre-chosen period of time.

19. The method of claim 10 wherein when the in-mask micro-display is in auxiliary view with the secondary subimage being shown in place of the at least portion of the primary subimage, a status notification indicia is shown on the in-mask micro-display notifying the user that the in-mask micro-display is in auxiliary view and identifying the location of the secondary subimage in the in-mask micro-display.

20. The method of claim 10 wherein in the wide-angle thermal image, the secondary subimage is located beyond an upper, lower, left or right boundary of the primary subimage and wherein upon the directional displacing of at least the portion of the primary subimage by the secondary subimage in the in-mask micro-display, the secondary subimage is shown on the micro-display as a floating subimage that is positioned on the primary subimage in a location that avoids at least one hot spot of the primary subimage;

and, wherein a directional indicia is shown on the in-mask micro-display indicating the direction that the secondary subimage was located relative to the primary subimage in the wide-angle thermal image.

* * * * *